Sept. 2, 1941.   V. H. BALLMANN   2,254,345
SEED AND GRAIN SEPARATOR AND CLEANER
Filed Aug. 16, 1939   3 Sheets-Sheet 1

SEED →→→
CHAFF ✳✳✳
ROUGHAGE ⊢⊢⊢
AIR ⇀⇀⇀

INVENTOR.
V. H. Ballmann
BY M. E. Fisher
ATTORNEY.

Sept. 2, 1941.　　　V. H. BALLMANN　　　2,254,345
SEED AND GRAIN SEPARATOR AND CLEANER
Filed Aug. 16, 1939　　　3 Sheets-Sheet 2

INVENTOR.
V. H. Ballmann
BY　　M. E. Fisher
ATTORNEY

Sept. 2, 1941.  V. H. BALLMANN  2,254,345
SEED AND GRAIN SEPARATOR AND CLEANER
Filed Aug. 16, 1939  3 Sheets-Sheet 3
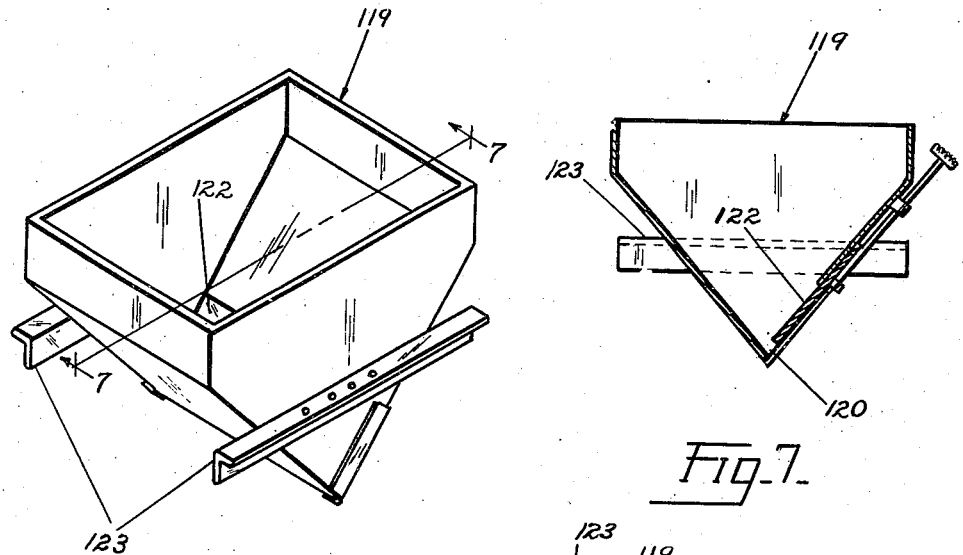
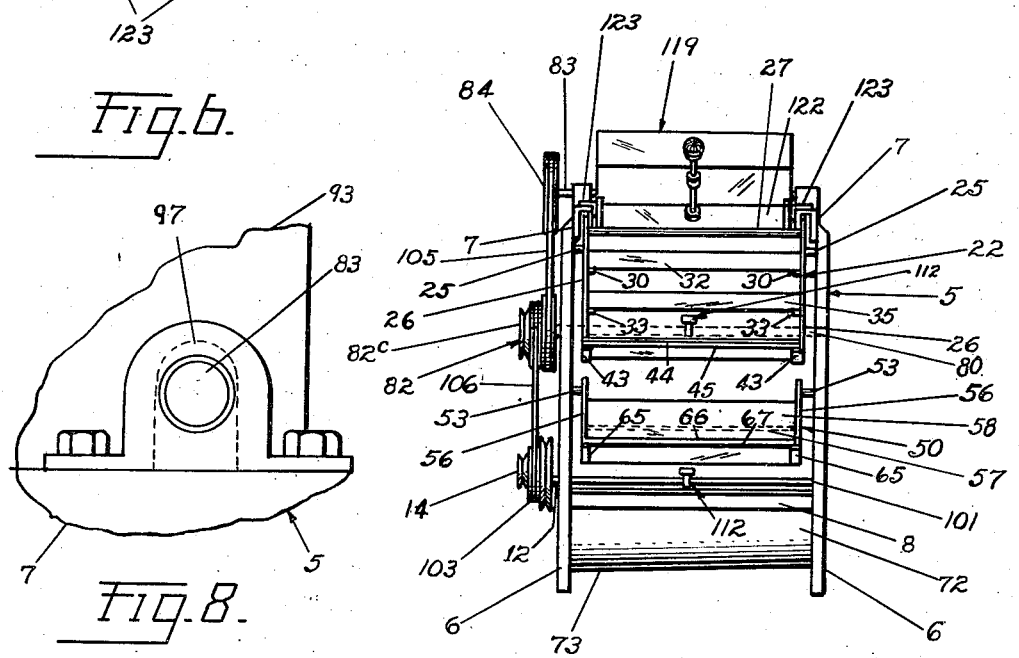
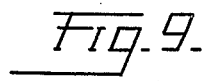
INVENTOR.
V. H. Ballmann
BY A. E. Fisher
ATTORNEY.

Patented Sept. 2, 1941

2,254,345

UNITED STATES PATENT OFFICE 2,254,345

SEED AND GRAIN SEPARATOR AND CLEANER

Vincent H. Ballmann, St. Louis, Mo.

Application August 16, 1939, Serial No. 290,349

1 Claim. (Cl. 209—318)

This invention relates to seed and grain separators and cleaners for use of farmers and others having need of such machine, through which chopped hay, clover, alfalfa, corn, beans and the like, are passed for the purpose of separating the seed or grain from the roughage, or for cleaning the seed and grain from dust and dirt.

One object of the invention is to provide a machine for the stated purposes in a relatively simple, compact and efficient form, ensuring the complete separation of all the seed and grain from the roughage, and the thorough cleaning of the seed and grain of dust and dirt.

Another object is to provide a machine of the kind referred to, comprising a supporting frame, shaker beds in the frame, super-posed screen and conveyor panels in the shaker beds and adapted to receive the chopped roughage or ensilage and shake and sift the seed or grain from the roughage, delivering the separated seed or grain, and the roughage from the machine at different points, a fan mounted in the frame for blowing out chaff, a hopper for removably mounting at the top of the machine in lieu of the conveyor panel, for receiving grain or seed to be passed through for cleaning, means for feeding the cut material into the machine, means for operating the machine, and adjustable means for regulating the pitch or degree of oscillation of the screen and conveyor panels.

With the foregoing objects in view, together with such additional objects and advantages as may appear from the specification, a preferred embodiment of the invention and its elements, is shown and illustrated in the accompanying drawings, wherein:

Figure 1 is a longitudinal vertical section through the machine as set up for use as a seed or grain separator, including a removable crawler type of feeder for receiving the chopped roughage or combined ensilage and seed, and delivering same onto screens and conveyors.

Figure 2 is a side elevation of the machine set up for cleaning seed or grain, the crawler feeder being removed, as well as a section of conveyor panel. The panel being replaced by a dust screen panel as shown in the broken section of the shaker bed side. A seed and grain hopper is mounted on top and to the front of the machine.

Figure 6 is an enlarged perspective view of the grain and seed hopper.

Figure 7 is a section on the line 7—7 of Figure 6.

Figure 8 is an enlarged fragmentary view, detailing the method of attaching the conveyor to the frame of the machine.

Figure 9 is a rear end view of the assembly of Figure 2.

Figures 1, 2:
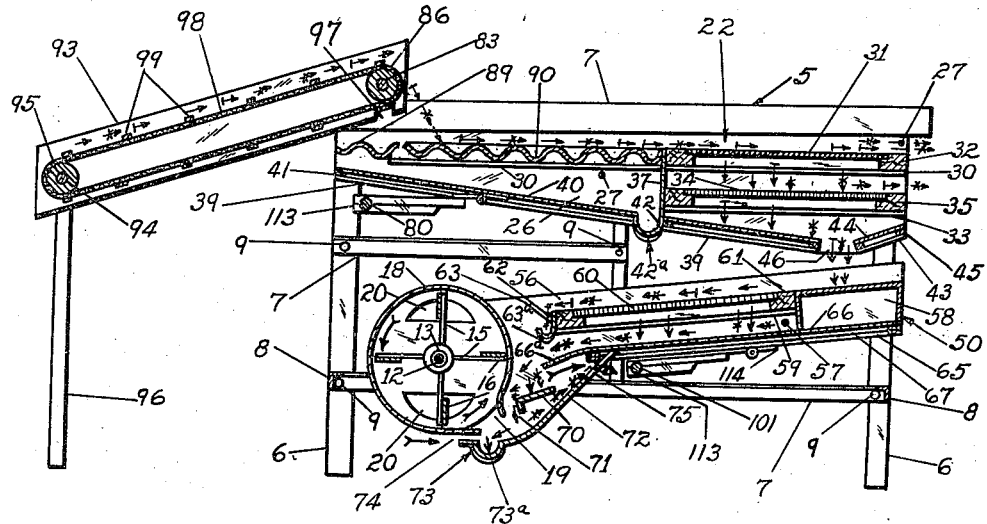
Figure 3:
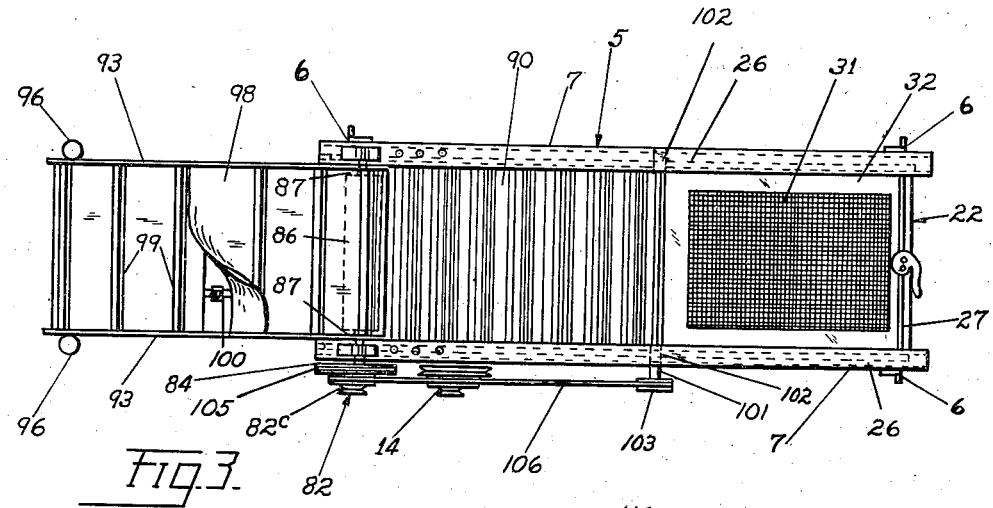
Figure 3 is a top plan view of the assembly of Figure 1.
Figures 4, 5:
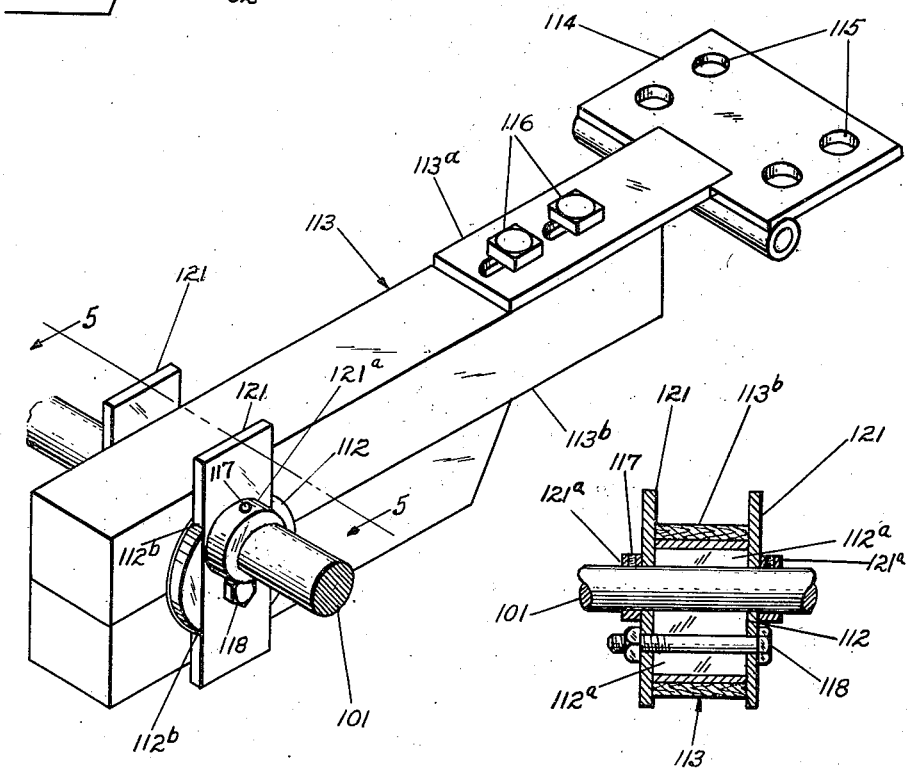
Figure 4 is a perspective detail, on an enlarged scale, of the main shaker mechanism, including the adjustable cam for regulating the pitch or throw of the shaker.
Figure 5 is a section on lines 5—5 of Figure 4.

In constructing the machine I provide a suitable supporting frame represented generally at 5, and including suitably spaced legs 6, upper and lower side bars 7, and end bars 8, all rigidly anchored together in a conventional manner by screws or bolts, indicated at 9 to form an elongate, rectangular frame of suitable size for the purpose.

A fan shaft 12 is tranversely mounted in the lower part of the frontal end of the frame, the ends thereof being journalled in bushings 13 anchored in the frame, and there being a belt-pulley 14 keyed to an extended end of the shaft, outwardly of the frame. Arms 15 are anchored at one end along this shaft and extended radially in tranverse alignment. Fan blades 16 are secured across the outer ends of the arms 15 and equally spaced from the shaft 12, thus completing a rotary paddle fan, the same in operation turning in the direction shown by the arrow.

A cylindrical fan housing 18 encloses this fan, the housing being secured at its ends to the frame. The fan housing is parted along its lower side, rearwardly of the shaft 12 to provide a mouth 19 through which air may be blown. Air inlet ports 20 are provided in the housing for supplying the fan.

An upper, primary, elongate shaker bed 22 is oscillatably or reciprocably hung within the upper side bars 7 by means of short hanger-links 23 pivoted at 24 and 25 to the ends of the side bars and bed respectively. The bed is hung so as to incline downward slightly towards the rear end. This bed comprises wide side boards 26 connected by cross bars 27. Cleats 30 are mounted along the inner faces of the boards 26, towards the upper margins thereof and extending from end to end.

Primary screen panels of varying mesh, one of which is represented at 31, and comprising screen wire of suitable mesh mounted in a frame 32, may be removably positioned upon the cleats 30 at the rear of the bed 22. The screen panels are of a length to extend approximately two-fifths the length of the bed, although these proportions may be varied. In parallel spaced relation below the cleats 30, at the rear of the bed 22, other and shorter cleats 33 are similarly secured to the inner faces of the boards 26, for removably engaging secondary screen panels, similar to the primary screens and also of varying mesh, one of the same being represented at 34 mounted in a frame 35 of the same size as the primary frame 32.

The secondary screen panel is inserted for more complete cleaning of the seed, and might be omitted without seriously impairing the efficiency of the machine, and within the scope of the invention.

A flat partition plate or strip 37 is mounted tranversely of the frame immediately at the forward or inner ends of the screen panels 31 and 34, the ends of the partition being secured to the side boards 26 and the partition extending from the upper cleats 30 slightly below the lower cleats 33.

Cleats 39 are secured along the inner faces of the lower margins of the side boards 26, from the front ends thereof substantially to the rear ends, and are arranged at a considerable dip or downward inclination from front to rear. An imperforate primary apron 40 of sheet metal or other material, marginally reinforced by a frame 41, is removably laid upon those cleats 39, the apron and frame being dimensioned to extend from side to side and from the front end of the bed 22 to a point spaced substantially inward from the rear end thereof. A dirt dust trough 42 is formed transversely of this apron at a point immediately forward of the lower depending margin of the partition 37, this trough being slightly inclined from end to end so as to discharge dirt or dust laterally through its lower and extended end or spout 42a.

Short cleats 43 are secured to the inner faces of the lower margins of the side boards 26 at the rear ends thereof, and are inclined downwardly and inwardly in horizontal alignment with the rear ends of the cleats 39. A supplementary, narrow, imperforate apron 44 in a frame 45 is removably laid upon these cleats, the element being dimensioned to fill the space between the side boards 26 and to extend inwardly, yet falling short of meeting the rear end of the main apron 40, so as to leave an intervening seed port or passage 46.

This narrow inwardly inclined apron 44 serves to retain the seed and grain in the machine, and prevents it from working out at the rear end of the machine and being lost.

A lower and shorter, secondary shaker bed 50, is oscillatably or reciprocably hung medially within the frame 5, beneath the bed 22 by means of short hanger-links 51 pivoted at 52 and 53 to supports 54 anchored to the frame 5. This bed is hung so as to incline downwardly and inwardly or forwardly, reversely to the inclination of the upper bed 22. This bed also comprises wide side boards 56 connected by cross bars 57. The lower and forward end of the bed 50 is disposed rearwardly or inwardly of the upper portion of the fan housing 18, with the side boards 56 partially overlapping the ends of the fan housing. An inclined box-like apron 58 is mounted between the rear ends of the boards 56 immediately below the grain or seed port 46 of the upper bed 22. Cleats 59 are mounted medially along the inner faces of the boards 56, on which is removably positioned a tertiary screen panel 60 in a frame 61, and representing one of a series of screens of varying mesh that may be so located. The screen 60 is of course of a width to fit freely within the side boards 56, and is of a length to extend forwardly and fit down back of a transverse stop strip 62 anchored at its ends in the boards 56 and formed with a depending and laterally inclined trough 63 designed for catching and discharging through its spout 63a small roughage that may succeed in working through the screens of the upper bed 22.

Cleats 65 are mounted along the inner faces of the boards 56 in spaced relation below the screen 60 and its supporting cleats 59, and an imperforate secondary apron 66 of sheet metal or other material, marginally reinforced by a frame 67 is removably laid upon these cleats, the apron and frame being dimensioned to nicely extend from side board to side board and from the box-apron 58 forwardly immediately beneath the trough 63 where it curves downward under this trough as indicated at 66a towards the mouth 19 of the fan housing 18.

A flat deflector strip or apron 70 is transversely mounted between the boards 56, in spaced relation below the down-turned delivery end 66a of the apron 66, this strip being inclined downwardly and forwardly in a spaced relation to the inner margin of the fan housing 18, thus providing a seed or grain delivery slot 71. The ends of the strip 70 are secured laterally to the side boards 56. Similarly an inclined base apron 72 is transversely mounted between the lower forward ends of the boards 56, its ends being anchored to these boards. The apron 72 is disposed in spaced relation below the deflector apron 70, and its forward end is curved horizontally beneath the lower margin of the housing 18 and suitably spaced therefrom. A final seed and grain trough 73 is formed transversely in the lowermost, forward and horizontal portion of the apron 72 and is inclined laterally so as to deliver the cleaned seed and grain through its spout 73a. The rear margin of the apron 72 is spaced from the deflector apron 70. Thus air-flow openings or slots 74 and 75 are provided, through which air may flow along the upper or inner side of the base apron 72, over the trough 73 in the direction indicated by the arrows.

A power receiving or driven shaft 80 is journalled through pillow blocks 81, transversely at the forward end of the frame 5, and a triple-pulley unit 82 is rigidly keyed upon an extended end of the shaft.

A feeder shaft 83 is similarly journaled through the upper forward corner of the frame 5, immediately above the shaft 80, and a pulley 84 is rigidly keyed at an end of this shaft in operative alignment with the inner pulley 82a of the pulley unit 82.

An apron roller 86 is rigidly keyed upon the shaft 83, within the frame and with its ends adjacent the ends of the shaft but leaving bearing spaces 87 on the shaft between the ends of the roller and the frame.

A short panel 89 of corrugated metal is permanently mounted upon the forward ends of the upper cleats 30 of the bed 22, immediately at the roller 86 but not interfering therewith. A conveyor panel 90 of like corrugated metal is dimensioned to removably position upon the same cleats 30 between the panel 89 and the primary screen panel 31. Likewise a dust screen panel 91 is provided, set in a frame 92 and dimensioned like the conveyor panel 90 for removably positioning at the forward end of the bed 22 upon the cleats 30, in lieu of the panel 90.

A crawler type of feeder is provided, comprising a pair of side boards 93 having a roller shaft 94 journalled at its ends through the forward ends of the boards and having an apron roller 95 complemental to the roller 86 medially keyed thereon. A pair of legs 96 are pivotally secured at their upper ends to the extended ends of the shaft 94. The rear ends of the boards 93 are notched out underneath, as shown at 97 and these ends are thus adapted to removably engage by said notches the bearing spaces 87 of the shaft 83. An apron conveyor 98 of canvas or the like and having a plurality of slats 99 secured transversely therealong in spaced relation, is mounted over the forward roller 95 the conveyor being of a length to enable its also embracing the rear roller 86 when the device is operatively located with the notched rear ends of the boards 93 bearing on the shaft 83 at the spaces 87, as above pointed out. Buckled straps 100 enable the conveyor 98 to be readily and operatively mounted upon the rollers or dismounted therefrom, as required.

A shaker shaft 101 is journalled through the frame 5 below the bed 50, as indicated at 102. A pulley 103 is keyed on the extended end of this shaft 101 in operative alignment with the central pulley 82 and fan pulley 14.

Belts 105 and 106 are operatively trained over the designated pulleys to rotate same as the driven pulley unit 82 is rotated in manner later explained. An idle pulley 107 is provided and journalled on a stub or bolt shaft 108 that may be adjustably mounted in any one of a series of holes 109 formed in the bar 110 mounted in the frame 5. Thus the belt 106 may be tightened as required.

Adjustable cams or cam rollers 112 are medially mounted on the shafts 80 and 101, and from these cams extend shaker arms 113 journalled at one end upon the flanged rollers 112 and having hinged attachment plates 114 at the opposite end, which plates are bolted or riveted at 115 medially to the under sides of the beds 22 and 50. The arms 113 are each of two overlapped and slotted parts 113a and 113b, joined by bolts 116 passed through the slots. By this arrangement the arms may be lengthened or shortened, to vary the throw or pitch of the arms and beds. The rollers 112 are slotted through from end to end as shown at 112a and may thus be eccentrically adjusted upon the shafts 80 and 101. These rollers are also slotted diametrically across each end in parallelism as shown at 112b for slidably engaging flat lugs 121 having hubs 121a whereby they are removably anchored to the shafts at either end of the rollers by means of set screws 117 passed down through threaded bores in these flanges and bearing upon the shafts. If preferred one of the lugs of each assembly may be welded to its shaft. Bolts 118 are passed through the lugs 121 at one end of each assembly and through the roller slots 112a. By then adjusting the rollers 112 to its required degree of eccentricity upon the shafts, and turning up the bolts 118, the rollers are firmly and operatively locked in position. The eccentric adjustability of the cam rollers enables the operator to further regulate the throw or pitch of the shaker beds 22 and 50. These cam assemblies and connected arms attached to the beds as described, serve to oscillate the beds forward and backward when power is applied, thus working the material down through the machine, over the screens and aprons, from top to bottom.

A seed hopper 119 is provided, the same having an opening 120 in the bottom, which opening may be increased or diminished by means of a slide 122 at one side of the hopper. Aligned cleats 123 are secured to the straight ends of the hopper, as means for removably positioning the hopper on the frame when the machine is to be used for cleaning seed and grain.

It is understood of course that the several screens or screen panels are to be of progressively finer mesh, from top to bottom of the machine, and that these screen panels are to be provided with meshes appropriate for the kind of seed or grain to be handled, separated, cleaned or screened.

In the use of the machine as a separator, as shown in Figure 1, the operator would position his conventional feed or ensilage chopper (not shown) and which of course is not part of this invention, so that chopped ensilage therefrom would be discharged upon the crawler feeder and a belt (not shown) would be extended from a pulley of that chopper over the pulley 82c, the two machines being thus operated simultaneously by the power applied to the chopper. But where the machine is to be used only as a seed or grain cleaner, as shown in Figure 2, then power would be taken from an electric motor (not shown) by means of a belt run from the motor over the pulley 82c. Of course any other source of power might be used.

As a separator (Figure 1) the chopped ensilage or roughage containing the seed or grain as well as some dust and chaff, would travel the courses indicated by the sets of arrows and accompanying legends, going over the feeder, conveyor panels 89—90 onto the primary screen panel 31, the seed and finer dust particles falling through onto the secondary screen panel 34, thence onto the primary apron 40, thence onto the tertiary screen panel 60, thence onto the secondary apron 66, thence onto the base apron 72 where passing downward, the final chaff and dust is blown out by the fan 16 through the opening 75, the cleaned seed falling into the lower trough 73 and out at the spout 73a; the roughage and coarser chaff meantime being passed rearwardly out through the end of the machine over the screen panels 31 and 34, the finer stuff however passing down onto the apron 40, screen panel 60, into the trough 63 and out at the spout 63a.

As a seed or grain cleaner (Figure 2), the seed or grain flows from the hopper 119 onto the dust screen panel 91 where the finer particles of dust fall through onto the upper partitioned end of the apron 40, thence into the trough 42 and out at the spout 42a; the seed or grain and coarser particles of dust meanwhile following the courses already indicated in the use of the machine as a separator, the cleaned seed or grain finally emerging at the lower spout 73a.

While I have herein described a preferred embodiment of the machine and its parts, it is understood that the said embodiment or any of the said structural features, may be changed or varied, within the scope of the claim.

I claim:

In a machine of the kind described, a supporting frame having front and rear portions, upper and lower shaker beds oscillatably mounted in the frame in vertically spaced relation, one or more screens mounted in the upper bed and inclined downwardly and rearwardly, frontal and rear imperforate aprons mounted in the upper bed below said screening, the aprons being inclined downwardly toward one another at their inner adjacent ends and these ends being spaced to provide an opening therebetween, a screen mounted in the lower bed below the openings of the aprons above, and inclined downwardly and forwardly, a laterally inclined trough with spout at the forward end of the screen for receiving roughage therefrom and discharging same, an imperforate apron mounted in the lower bed below the screen thereof and inclined downwardly and forwardly a base apron below the last mentioned apron, and spaced therefrom to provide an air opening over its rear end, the base apron being inclined downwardly and forwardly, a laterally inclined seed trough with spout in the lower, forward part of the base apron, a fan mounted over the lower, forward part of the base apron, shaker mechanism for oscillating the shaker beds, and means for operating the shaker mechanism and the fan.

VINCENT H. BALLMANN.